J. NASH.

Grain Separator.

No. 1,215. Reissued July 23, 1861.

Witnesses:

John M. May
C. E. Harwood

Inventor:

Jefferson Nash

N. PETERS, Photo-Lithographer, Washington, D. C.

UNITED STATES PATENT OFFICE.

JEFFERSON NASH, OF JANESVILLE, WISCONSIN, ASSIGNOR TO HIMSELF AND ALONZO K. CURTIS.

IMPROVEMENT IN GRAIN-SEPARATORS.

Specification forming part of Letters Patent No. 25,608, dated September 27, 1859; Reissue No. 1,215, dated July 23, 1861.

*To all whom it may concern:*

Be it known that I, JEFFERSON NASH, of the county of Rock and State of Wisconsin, have invented a new and useful Improvement in Grain-Separators; and I do hereby declare that the following is a full and exact description thereof, reference being had to the accompanying drawings, and to the letters of reference marked thereon, the same letters of reference indicating corresponding parts in each figure.

The nature of my invention consists, first, in making a grain-separator with apertures in its side, so as to allow the separator-shoe to vibrate laterally its entire length through the sides of the separator, whereby a large amount of material is saved in constructing, and the separator made much less in width, while retaining the same width of sieves; second, in constructing a separator-hopper without any bottom, and the rear end of the hopper movable, to admit and regulate the feed into the shoe nearly its entire length; third, in so jointing the forward end of a sieve or gang of sieves in a separator-shoe that the rear end of the sieve or sieves may be moved up or down to give the desired tilt, both sieve and shoe vibrating laterally their entire length; fourth, in giving a lateral body motion of the entire shoe, in combination with a longitudinal motion of a sieve or sieves below the shoe, for the purpose of obtaining the greatest possible facility in separating grain.

Figure 1:
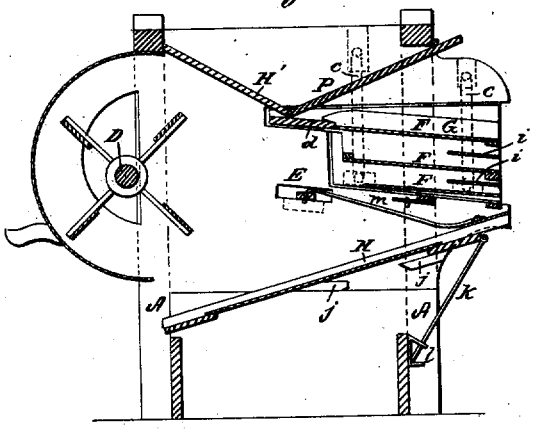
Figure 3:
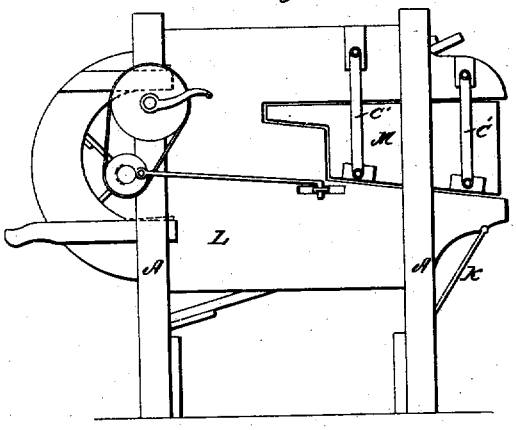
Figure 4:
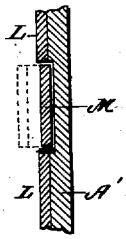
Figure 2:
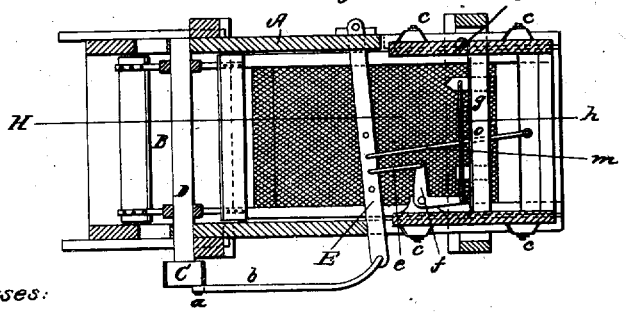

Figure 1 represents a longitudinal vertical section of a grain-separator constructed according to my invention. Fig. 2 is a horizontal section. Fig. 3 is an elevation showing a side of a separator with an aperture in which the shoe is suspended, and through which it vibrates. Fig. 4 is a sectional view of a post of the frame partly cut away to allow a greater vibratory motion of the shoe.

To enable those skilled in the art to fully understand, make, and use my improved grain-separator, I will proceed to describe its construction and operation.

A represents a frame, which serves to support a fan-blower, B, and the several sieves, which will be hereinafter more fully explained. The fan-blower receives its motion from some source of power from which motion is conveyed to a pulley, C, on the axle D of the fan-blower, and secured to the side of this pulley is an eccentric wrist-pin, *a*, which connects, by means of a rod, *b*, with a vibrating lever, E, which extends through the whole width of the machine, and the fulcrum of which is a pivot, *c'*. The sieves F are arranged in a shoe, G, which is supported from hinged rods C', and which is provided with an apron, *d*, close under the opening in the hopper H' and P. The shoe connects with the lever E by means of a rod, *e*, which extends from the lever to one arm of an elbow-crank, *f*, and the other arm of this crank connects with a cross-brace, *g*, of the shoe by means of a rod, *h*, and, if thus connected, the motion of the shoe is in a transverse direction. The rod *h*, however, may be disconnected from the elbow-crank, and it can be connected directly with the lever E, and in this case the motion of the shoe is in a longitudinal direction. The lever E, as well as the elbow-crank *f*, is provided with series of holes whereby the motion given to the shoe can be regulated for different kinds of grain. The sieves F are arranged in a common frame, one above the other, and they are of uniform texture, and placed between each pair of full-sized sieves are the sectional sieves *i*, which materially assist in cleaning and separating the grain, and they are secured to the shoe by means of buttons, or any other convenient manner. Arranged under the shoe G, and supported by projections and by rod *k*, is an additional sieve, H, in an inclined position, which connects with the lever E by means of a rod, *m*, so that when the lever is agitated a reciprocating motion is communicated to the sieve H in a longitudinal direction, and the rod *k* is stepped on a lug, *l*, which is secured to one of the cross-bars of the frame A in such a position that the rok *k* is in an inclined position, and that by the action of this rod the sieve as it is moved in a longitudinal direction receives at the same time slight up and down motion, which materially facilitates the operation of cleaning. This is provided with a throat, *o*, through which the lighter parts of the chaff are driven out by the action of the blast from the fan-blower.

This invention is of a particular advantage for cleaning spring wheat, which is very difficult to clean with any other grain-separator, as now constructed, and it can be used equally well for all sorts of grain, and it is only necessary to regulate the throw of the shoe G and the motion of the sieve H by shifting the rods *e* and *m* to different holes in the lever E.

L in Fig. 3 is the side casing of the separator that is attached to the inside of frame A. The casing is perforated or cut away to allow the shoe M to vibrate through the sides of the separator, the shoe being suspended by rods or straps C′, as before described, whereby the great width necessary for the vibration of a shoe wholly inside of the ordinary separator is obviated, the width being reduced some four to eight inches, (more or less,) although using the same width of sieve as is used with the ordinary separator, thus not only giving the advantage of saving in width, which allows the separator to be passed through a smaller door and occupy less space, but also a saving of material in its construction, and less weight in handling. The sides of the shoe M may be taken or cut from the casing L itself, or made of separate material. The shoe M vibrates its entire length laterally in the separator, and the front and rear ends the same distance, while the screen H, when it is used, vibrates longitudinally at the same time, which body motion of the shoe its entire length, as described, simultaneously with the screen, gives great efficiency and rapidity to the work of separating grain. If the vibration is needed to be great, a part of the rear post may be cut away, as shown by a sectional drawing in Fig. 4. The sides or casing L of the separator form the sides of the hopper. The forward end is formed of piece H′, which is stationary, and the rear end by piece P, which is movable. (See Fig. 1.) This hopper has no bottom. The front end of the shoe conducts the grain into the sieve. The parts H′ and P′ come together at apron *d*, and the feed from the hopper onto the apron extends the entire, or nearly the entire, width of the separator, so that the grain is already distributed the entire width of the sieve, whereby time and labor are saved. The part P of the hopper that is movable when drawn or moved separates its lowest edge from part H, whereby the feed is regulated. The grain in the hopper pressing upon the part P keeps it in any desired position, or it may be moved and kept in place by a screw or button or other suitable device. The shoe M contains the sieves, that may be in a gang or nest, or separate seives. The forward ends of the sieves are hinged or pivoted in any proper manner to the forward end of the shoe, to allow the rear end of the sieves to be given any desired outward tilt, and the rear end held by straps or otherwise, the hinge or pivot taking the place of grooves in the inside of the shoe of the usual separator to receive the sieves, and by which the angle or tilt of the sieves can only be changed as the grooves will permit; whereas by my device the change can be most minute, to adapt it to any kind of grain or grass seed.

I am aware that a part of a hopper side has been made movable to regulate the feed, and do not claim the movable side, independent of its arrangement and connection with a lateral vibrating motion of a shoe, as described.

I am also aware that a shoe and screen have been used to operate in unison when the shoe has its forward end jointed or pivoted to the separator, forming an axis, and do not claim a combination of a shoe and screen, except when the shoe vibrates with a body motion its entire length, as described.

What I claim as my invention, and desire to secure by Letters Patent, is—

1. The arrangement and combination of a vibrating lever, E, the elbow-crank *f*, and the rods *e* and *h*, whereby the motion of the shoe can be changed from a longitudinal to a transverse direction, and vice versa, substantially as herein described.

2. Making a grain-separator with apertures in its sides or casing L, through which to allow the shoe M to vibrate, substantially as and for the purpose described.

3. Giving a lateral body motion of the entire shoe M, when constructed substantially as described, in combination with a longitudinal motion of a screen, H, substantially as and for the purposes described.

4. The rod *k* in combination with sieve or screen H and step *l* for the purpose of giving a jog or slight up-and-down motion as the separator is operated, substantially as described.

JEFFERSON NASH.

Witnesses:
JOHN M. MAY,
C. E. HARWOOD.